Dec. 4, 1945.  W. B. RAYTON ET AL  2,390,387
TELEPHOTO OBJECTIVE
Filed Jan. 31, 1944

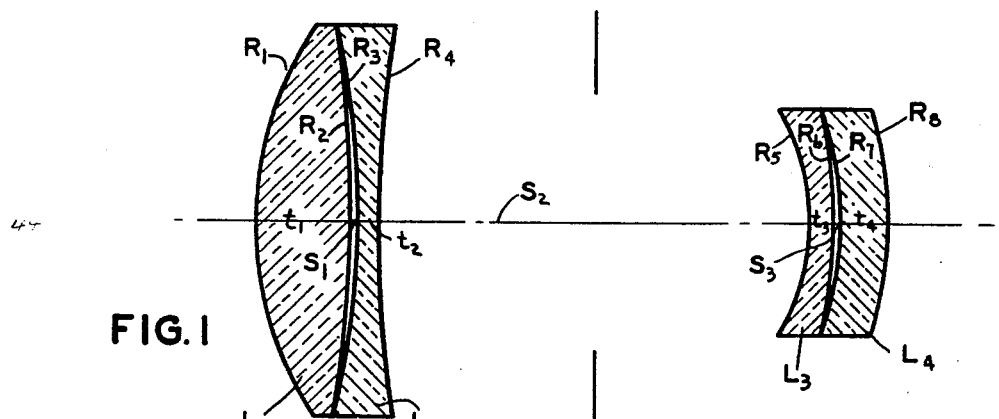

FIG. 1

FOCAL LENGTH 100 mm.   F.5.6
| LENS | $N_D$ | $\nu$ | RADII | | SPACINGS | |
|---|---|---|---|---|---|---|
| $L_1$ | 1.5170 | 64.5 | $R_1$ = 17.00 mm. | | $t_1$ = 4.5 mm. | |
|  |  |  | $R_2$ = 62.57 | | $S_1$ = .006 | |
| $L_2$ | 1.6490 | 33.8 | $R_3$ = 61.86 | | $t_2$ = 1.3 | |
|  |  |  | $R_4$ = 60.45 | | $S_2$ = 20.99 | |
| $L_3$ | 1.5286 | 51.6 | $R_5$ = 10.61 | | $t_3$ = 1.4 | |
|  |  |  | $R_6$ = 24.76 | | $S_3$ = .011 | |
| $L_4$ | 1.7200 | 29.3 | $R_7$ = 24.25 | | $t_4$ = 2.4 | |
|  |  |  | $R_8$ = 18.57 | | | |

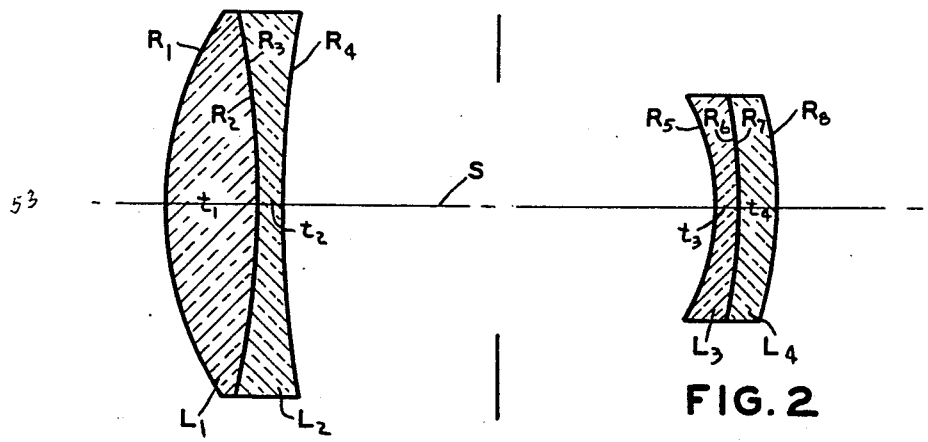

FIG. 2

FOCAL LENGTH 100 mm.   F.5.6
| LENS | $N_D$ | $\nu$ | RADII | SPACINGS |
|---|---|---|---|---|
| $L_1$ | 1.5170 | 64.5 | $R_1$ = 18.95 mm. | $t_1$ = 4.5 mm. |
|  |  |  | $R_2$ = 45.40 | |
| $L_2$ | 1.6210 | 36.2 | $R_3$ = 45.40 | $t_2$ = 1.3 |
|  |  |  | $R_4$ = 57.40 | S = 21.08 |
| $L_3$ | 1.5286 | 51.6 | $R_5$ = 10.75 | $t_3$ = 1.2 |
|  |  |  | $R_6$ = 28.50 | |
| $L_4$ | 1.7200 | 29.3 | $R_7$ = 28.50 | $t_4$ = 1.8 |
|  |  |  | $R_8$ = 19.49 | |

WILBUR B. RAYTON
LENA M. HUDSON
INVENTORS
BY
ATTORNEYS

Patented Dec. 4, 1945      2,390,387

UNITED STATES PATENT OFFICE 2,390,387

TELEPHOTO OBJECTIVE

Wilbur B. Rayton, Rochester, and Lena M. Hudson, Brighton, N. Y., assignors to Bausch & Lomb Optical Company, Rochester, N. Y., a corporation of New York Application January 31, 1944, Serial No. 520,490

4 Claims. (Cl. 88—57)

This invention relates to objective lenses and more particularly it has reference to telephoto objectives of the type in which the front positive and rear negative components are separated by a diaphragm and each formed of two elements.

Prior art lenses of this type are limited as to the field of view that can be covered and the relative aperture that can be employed because of residual aberrations which adversely affect the image when certain limits are exceeded. Thus, prior art lenses do, for a field of view of 30° and a relative aperture of f:5.6, provide an image that is reasonably useful though still susceptible to improvement.

One of the objects of this invention is to improve the image quality of lenses of the type mentioned, particularly with reference to astigmatism, coma and curvature of field. Another object is to provide a lens of the type described in which the elements of the rear component have a difference of refractive index of at least 0.160. A further object is to provide a lens of the type described in which the adjacent elements of each component are separated by air spaces. These and other objects and advantages reside in certain novel features of construction, arrangement and combination of parts as will hereinafter be more fully explained and pointed out in the appended claims.

Referring to the drawing:

Fig. 1 shows a telephoto lens embodying the invention.

Fig. 2 shows another embodiment of the invention.

A preferred embodiment of the invention, shown in Fig. 1, embodies a front positive component made up of two elements which are separated by a meniscus-shaped air space. The rear negative component, which is separated from the front component by a diaphragm, is made up of two meniscus-shaped elements which are separated by a meniscus-shaped air space. It has been found that the image quality, particularly as to curvature of field, coma and astigmatism, is greatly improved when the refractive indices of the two elements of the rear component differ by an amount which is at least 0.160. It has been further discovered that the image characteristics in the margin of the field require that oblique pencils shall be incident upon the inner, adjacent surfaces of the two elements of the rear component at relatively small angles of incidence. This condition is met when the radius of curvature of each of the two inner, adjacent faces of the rear component has a value which is not less than about 20% or greater than 35% of the equivalent focal length of the entire lens combination.

In the construction shown in Fig. 1, the elements of each of the front and rear components are separated by an air space and hence the need for cement is eliminated. This is especially important in lenses which are apt to be subjected successively to extreme changes in temperature, such as would be encountered when using the lenses in aerial photography. Sudden changes in temperature often produce fine cracks in the cement layer or may even cause a separation of the lens elements so that the lens may give a poor performance or be rendered entirely useless.

The specifications for a telephoto lens embodying the construction shown in Fig. 1 and having a focal length of 100 mm. and a speed of f:5.6 are set forth in the following table:

| Lens | $N_D$ | $V$ | Radii | Thicknesses and spacings |
|---|---|---|---|---|
| $L_1$ | 1.5170 | 64.5 | $R_1=17.00$ | $t_1=4.5$ mm. |
|  |  |  | $R_2=62.57$ | $S_1=.006$ |
| $L_2$ | 1.6490 | 33.8 | $R_3=61.86$ | $t_2=1.3$ |
|  |  |  | $R_4=60.45$ | $S_2=20.99$ |
| $L_3$ | 1.5286 | 51.6 | $R_5=10.61$ | $t_3=1.4$ |
|  |  |  | $R_6=24.76$ |  |
| $L_4$ | 1.7200 | 29.3 | $R_7=24.25$ | $t_4=2.4$ |
|  |  |  | $R_8=17.57$ | $S_3=.011$ |

Another embodiment of the invention is shown in Fig. 2 wherein there is disclosed a telephoto lens having its front and rear components each consisting of two cemented elements. Although this construction may not be suited for certain uses because of its cemented elements, it does provide good image quality since it embodies features of the invention. In this modification, the difference between the refractive indices of the two elements of the rear component is maintained at a value which is not less than 0.160 and the radius of curvature of each of the two inner, adjacent faces of the two elements is not greater than 35% of the equivalent focal length of the entire lens combination.

The specifications for a telephoto lens embodying the construction shown in Fig. 2 and having a focal length of 100 mm. and a speed of f:5.6 are set forth in the following table:

| Lens | $N_D$ | V | Radii | Thicknesses and spacings |
|---|---|---|---|---|
| $L_1$ | 1.5170 | 64.5 | $R_1=16.95$ | $t_1=4.5$ |
| | | | $R_2=45.40$ | |
| $L_2$ | 1.6210 | 36.2 | $R_3=45.40$ | $t_2=1.3$ |
| | | | $R_4=57.40$ | $S=21.08$ |
| $L_3$ | 1.52860 | 51.6 | $R_5=10.75$ | $t_3=1.2$ |
| | | | $R_6=28.50$ | |
| $L_4$ | 1.7200 | 29.3 | $R_7=28.50$ | $t_4=1.8$ |
| | | | $R_8=19.49$ | |

We claim:

1. An objective lens comprising spaced front positive and rear negative components, said negative component consisting of two meniscus elements with their concave surfaces facing the front positive component, said elements having refractive indices that differ by at least 0.160, the inner adjacent faces of said elements having radii of curvature which are each not less than 20% or more than 35% of the equivalent focal length of the lens.

2. A telephoto lens comprising spaced front positive and rear negative components, said positive component consisting of a double convex element and a double concave element, said negative component consisting of two meniscus elements with their concave surfaces facing the front component, said last-named elements having different refractive indices which differ by a value of at least 0.160, the radius of curvature of each of the adjacent faces of said last-named elements being not less than 20% or more than 35% of the equivalent focal length of the entire lens.

3. An objective lens comprising spaced front positive and rear negative components, the front positive component consisting of two elements which are separated by a meniscus-shaped air space, the rear negative component consisting of two meniscus elements separated by a meniscus-shaped air space having its concave side facing the front component, said meniscus elements having refractive indices that differ by a value of at least 0.160, the radius of curvature of each of the adjacent faces of the meniscus elements having a value of 20–35% of the equivalent focal length of the objective lens.

4. An objective lens comprising spaced front positive and rear negative components, said front component consisting of a double convex element and a double concave element separated by a meniscus-shaped air space having its concave side facing the object space, said rear component consisting of two meniscus-shaped elements separated by a meniscus-shaped air space having its concave side facing the front component, said meniscus elements having refractive indices that differ, respectively, by at least 0.160, the inner adjacent faces of said last-named elements having radii of curvature that are each greater than 20% and less than 35% of the equivalent focal length of the lens.

WILBUR B. RAYTON.
LENA M. HUDSON.